US008316027B2

(12) United States Patent
Pavlik

(10) Patent No.: US 8,316,027 B2
(45) Date of Patent: Nov. 20, 2012

(54) SEARCHING TWO OR MORE MEDIA SOURCES FOR MEDIA

(75) Inventor: John Pavlik, Ossining, NY (US)

(73) Assignee: Creston Electronics Inc., Rockleigh, NJ (US)

( * ) Notice: Subject to any disclaimer, the term of this patent is extended or adjusted under 35 U.S.C. 154(b) by 260 days.

(21) Appl. No.: 12/722,771

(22) Filed: Mar. 12, 2010

(65) Prior Publication Data
US 2011/0225156 A1 Sep. 15, 2011

(51) Int. Cl.
G06F 17/30 (2006.01)
(52) U.S. Cl. .......................... 707/737; 707/913
(58) Field of Classification Search .................. 707/736, 707/769, 737, 754
See application file for complete search history.

(56) References Cited

U.S. PATENT DOCUMENTS

| 6,721,748 | B1 * | 4/2004 | Knight et al. ................. 1/1 |
| 6,847,977 | B2 | 1/2005 | Abajian |
| 6,944,612 | B2 * | 9/2005 | Roustant et al. ............. 707/706 |
| 7,251,790 | B1 * | 7/2007 | Drucker et al. .............. 715/838 |
| 7,774,345 | B2 * | 8/2010 | MacLaurin et al. .......... 707/736 |
| 7,912,827 | B2 * | 3/2011 | Byers et al. ................. 707/706 |
| 8,001,154 | B2 * | 8/2011 | Brito et al. ................. 707/796 |
| 2002/0087599 | A1 | 7/2002 | Grant et al. |
| 2002/0147704 | A1 | 10/2002 | Borchers |
| 2005/0289107 | A1 * | 12/2005 | Arrouye et al. .............. 707/1 |
| 2006/0026162 | A1 * | 2/2006 | Salmonsen et al. .......... 707/10 |
| 2006/0161528 | A1 * | 7/2006 | Dettinger et al. ............ 707/3 |
| 2006/0161635 | A1 * | 7/2006 | Lamkin et al. .............. 709/217 |
| 2006/0168126 | A1 | 7/2006 | Costa-Requena et al. |
| 2007/0058674 | A1 * | 3/2007 | Bucher et al. ............... 370/468 |
| 2008/0307456 | A1 * | 12/2008 | Beetcher et al. ............. 725/38 |
| 2009/0094197 | A1 | 4/2009 | Fein et al. |
| 2009/0106202 | A1 | 4/2009 | Mizrahi |

OTHER PUBLICATIONS

Oregan Networks, "Oregan Launches Integrated Multimedia Search", Digital Media Connected, 2008, London, UK, www.oregan.net.
Oregan Networks, "Oregan Highlights Integrated Multimedia Search as Key Feature of Oregan Media Browser 4.0 for Living Room AV Consumer Electronics", Press Release, Feb. 22, 2008, www.oregan.net.
Oregan Networks, "Oregan Highlights Integrated Multimedia Search as Key Feature of Oregan Media Browser 4.0 for Living Room AV Consumer Electronics", Business Wire, Feb. 22, 2008, www.oregan.net.
Oregan Networks, "Oregan Networks Unveils Onyx Browser Application for Connected DTVs, Enabling Search and Playback of Personal and Commercial Media from Multiple Sources", Business Wire, Feb. 5, 2009, www.oregan.net.

* cited by examiner

Primary Examiner — Jorge A Casanova
(74) Attorney, Agent, or Firm — Crestron Electronics Inc.

(57) ABSTRACT

Presented is a method for obtaining a single set of media search results from a search of media sources. The method includes providing a search query, executing a search of each of the media sources for media based on the provided search query, generating results of the searches, and consolidating the results of the searches into the single set of search results that include a list of media items with associated metadata. The method further includes organizing the media items into groups. Each of the groups includes media items that have similar content. The similarity of the content is defined by the media items' associated metadata meeting a metadata matching threshold. The method further includes filtering the groups, sorting the groups of media items with respect to each other, sorting the media items within the groups, and displaying the groups of media items.

19 Claims, 10 Drawing Sheets

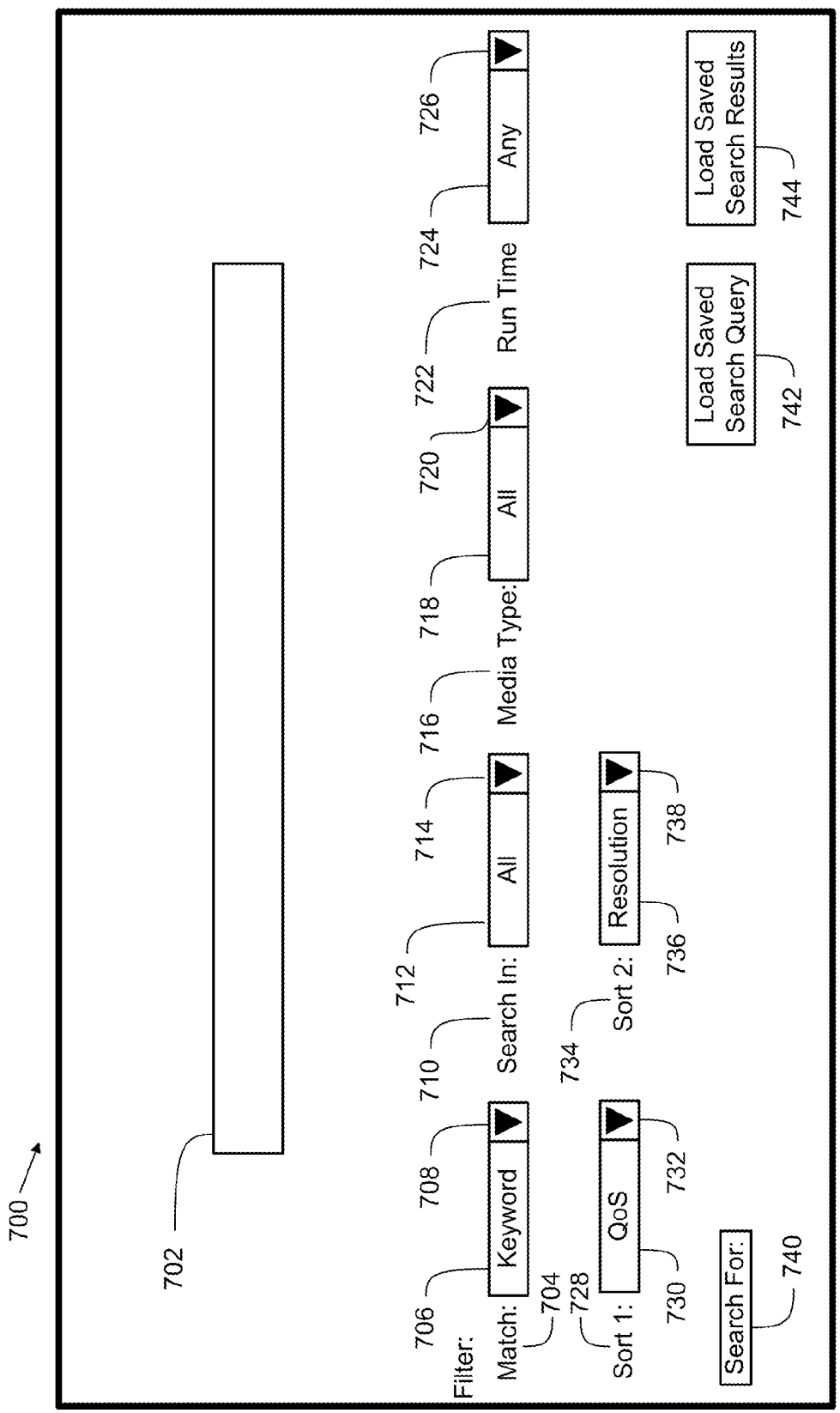

SEARCHING TWO OR MORE MEDIA SOURCES FOR MEDIA

BACKGROUND OF THE INVENTION

1. Technical Field

The present invention generally relates to searching two or more media sources for media, and more particularly to consolidating the results of the searches of the two more media sources into a single set of search results, grouping, filtering, and sorting the single set of search results, and presenting the grouped and sorted single set search results to a user.

2. Background Art

Searching online for various media such as video, audio, and still images is known. Further, searching for such media on a user's local hard drive is also known. For example, programs such as Microsoft's Media Center®, Google®, Yahoo®, Youtube®, OSX®, iTunes®, Windows®, and TIVO®, all include integrated search mechanisms to locate specific data.

However, each of these programs compartmentalizes the search process to specific kinds of data. For example, iTunes.com® locates all media stored or available within the iTunes® system, which is a small subset of all the video, images, and audio available online. iTunes® also only searches for data stored in its own format, and does not search a users locally or remotely stored available data. Youtube® only searches for videos on Youtube®. Windows® only searches for data on the user's internal and external hard drives. Yahoo® only searches the internet and not the user's hard drive or local media storage devices. Google®, while providing a mechanism to search both the internet and the user's hard drive, cannot search both the internet and the user's hard drive simultaneously and provide a single set of search results. Further, Google only allows searches dedicated to video, audio, or images, and does not provide a mechanism for searching for all media types at the same time.

Thus, there does not exist a system that searches all known media sources, both local and remote, and presents to a user a consolidated list of search results that is grouped according to media content and filtered and sorted according to the user's preferences.

SUMMARY OF THE INVENTION

It is to be understood that both the general and detailed descriptions that follow are exemplary and explanatory only and are not restrictive of the invention.

DISCLOSURE OF THE INVENTION

In one aspect, the invention involves a method for obtaining a single set of media search results from a search of each of a plurality of media sources and displaying the single set of media search results on a display device. The method includes providing a media search query, executing a search of each of the plurality of media sources for media based on the provided media search query, and generating results of the search of each of the plurality of media sources. The method further includes consolidating the results of each of the plurality of searches into the single set of media search results, which include a list of media items. Each of the listed media items has associated metadata. The method further includes organizing the media items into two or more groups. Each of the two or more groups includes media items having similar content. The similarity of the content of the media items is defined by the media items' associated metadata meeting or exceeding a metadata matching threshold. The method still further includes filtering the two or more groups of media items, sorting the two or more groups of media items with respect to each other according to cost or quality of service of the media, sorting the media items within each of the two or more groups of media items according to the resolution of the media items; and displaying the two or more groups of media items on the display device.

In one embodiment, the media items within each of the two or more groups are further sorted according to a quality of service with which the media items can be obtained, purchase price of the media items, or a user's previous sorting criteria.

In another embodiment, the filtering includes eliminating media items from the two or more groups of media items according to at least one of media content, media location, media format, and media duration.

In still another embodiment, the method further includes saving the media search query and the single set of media search results.

In yet another embodiment, the method further includes displaying on the display device a preview thumbnail picture associated with each of the media items listed in the single set of media search results, each group of media items, and/or each of the media items within the two or more groups of results.

In another embodiment, the plurality of media sources includes a hard disk disposed in a user's local desktop computer, mobile/portable computer, a home theater personal computer, a network attached storage device, a local external hard disk, a personal data assistant, a mobile phone. a digital video recorder, a DVD/Blu-Ray disc changer, an audio storage and playback device, a digital video camera, a digital picture camera, a remote computer server, and/or a remote database.

In still another embodiment, each media item listed in the single set of media search results includes an associated link. The link provides access to the associated media item for downloading, viewing, and/or hearing. The media item includes a digital image file, a digital video file, a digital audio file, or an archive file, which includes a digital image file, a digital video file, and/or a digital audio file.

In another aspect, the invention involves a system for obtaining and displaying a single set of media search results from a search of each of a plurality of media sources. The system includes an input module configured for receiving a media search query, a search module configured for executing a search of each of the plurality of media sources for media based on the received media search query, and a consolidating module configured for consolidating the results of each of the plurality of searches into the single set of media search results. The results include a list of media items. Each of the listed media items has associated metadata. The system further includes a grouping module configured for organizing the media items into two or more groups. Each of the two or more groups includes media items having similar content. The similarity of the content of the media items is defined by the media items' associated metadata meeting or exceeding a metadata matching threshold. The system further includes a filtering module configured for filtering the two or more groups of media items, and a sorting module configured for sorting the two or more groups of media items with respect to each other according to cost or quality of service and for sorting the media items within each of the two or more groups of media items according to the resolution of the media items. The system still further includes a display device, and a presenting module configured for displaying the grouped single set of media search results on the display device.

In one embodiment, the system further includes a mass storage device configured for storing the media search query and the single set of media search results.

In another embodiment, the sorting module is configured for further sorting the media items within each of the two or more groups according to quality of service with which the media items can be obtained, purchase price of the media items, or a user's previous sorting criteria.

In still another embodiment, the filtering module is configured for eliminating results from the list of media items according to at least one of media content, media location, media format, and media duration.

In yet another embodiment, the filtering module is configured for eliminating results from the two or more groups of media items according to at least one of media content, media location, media format, and media duration.

In another embodiment, the presenting module is further configured for displaying on the display device a preview picture associated with each of the media items listed in the single set of media search results, each group of media items, and/or each of the media items within the two or more groups of results.

In yet another embodiment, the plurality of media sources comprises at a hard disk disposed in a user's local desktop computer, mobile/portable computer, a home theater personal computer, a network attached storage device, a local external hard disk, a personal data assistant, a mobile phone, a digital video recorder, a DVD/Blu-Ray disc changer, an audio storage and playback device, a digital video camera, a digital picture camera, a remote computer server, and a remote database.

In another embodiment, each media item listed in the single set of media search results includes an associated link. The link provides access to the associated media item for downloading, viewing, and/or hearing. The media includes a digital image file, a digital video file, a digital audio file, and/or an archive file, which includes a digital image file, a digital video file, and/or a digital audio file.

In still another embodiment, the display device includes a television, a computer monitor, a mobile computer monitor, a touch screen, a mobile phone, and/or a personal data assistant.

In yet another embodiment, the system further includes a processor. The input module, the search module, the consolidating module, the grouping module, the filtering module, the sorting module, and the presenting module are implemented on the processor.

In another embodiment, the system further includes a plurality of processors. The input module, the search module, the consolidating module, the grouping module, the filtering module, the sorting module, and the presenting module are implemented on a different one of the plurality of processors.

In still another aspect, the invention involves a method for obtaining a single set of media search results from a search of each of a plurality of media sources and displaying the single set of media search results on a display device. The method includes providing a media search query, executing a search of each of the plurality of media sources for media based on the provided media search query, generating results of the search of each of the plurality of media sources, and consolidating the results of each of the plurality of searches into the single set of media search results comprising a list of media items. Each of the listed media items has associated metadata. The method further includes organizing the media items into two or more groups. Each of the two or more groups includes media items having similar content. The similarity of the content of the media items is defined by the media items' associated metadata meeting or exceeding a metadata matching threshold. The method further includes filtering the two or more groups of media items, sorting the two or more groups of media items according to cost or quality of service of the media, sorting the media items within the two or more groups of media items with respect to each other according to the resolution of the media items, and displaying the two or more groups of media items on the display device. The plurality of media sources includes a hard disk disposed in a user's local desktop computer, mobile/portable computer, a home theater personal computer, a network attached storage device, a local external hard disk, a personal data assistant, a mobile phone, a digital video recorder, a DVD/Blu-Ray disc changer, an audio storage and playback device, a digital video camera, a digital picture camera, a remote computer server, and/or a remote database.

In yet another aspect, the invention involves a system for obtaining and displaying a single set of media search results from a search of each of a plurality of media sources. The system includes an input module configured for receiving a media search query, a search module configured for executing a search of each of the plurality of media sources for media based on the received media search query, and a consolidating module configured for consolidating the results of each of the plurality of searches into the single set of media search results, which include a list of media items. Each of the listed media items has associated metadata. The system further includes a grouping module configured for organizing the media items into two or more groups. Each of the two or more groups includes media items having similar content. The similarity of the content of the media items is defined by the media items' associated metadata meeting or exceeding a metadata matching threshold. The system further includes a filtering module configured for filtering the two or more groups of media items, and a sorting module configured for sorting the two or more groups of media items with respect to each other according to cost or quality of service and for sorting the media items within the two or more groups of media items according to the resolution of the media items. The system further includes a display device, and a presenting module configured for displaying the grouped single set of media search results on the display device. The plurality of media sources includes a hard disk disposed in a user's local desktop computer, mobile/portable computer, a home theater personal computer, a network attached storage device, a local external hard disk, a personal data assistant, a mobile phone, a digital video recorder, a DVD/Blu-Ray disc changer, an audio storage and playback device, a digital video camera, a digital picture camera, a remote computer server, and/or a remote database.

In another aspect, the invention involves a method for obtaining a single set of media search results from a search of each of a plurality of media sources and displaying the single set of media search results on a display device. The method includes providing a media search query, executing a search of each of the plurality of media sources for media based on the provided media search query, generating results of the search of each of the plurality of media sources, and consolidating the results of each of the plurality of searches into the single set of media search results. The single set of media search results includes a list of media items, where each of the listed media items has associated metadata. The method further includes organizing the media items into two or more groups. Each of the two or more groups includes media items having similar content. The similarity of the content of the media items is defined by the media items' associated metadata meeting or exceeding a metadata matching threshold. The method further comprises sorting the two or more groups of media items with respect to each other, sorting the media items within each of the two or more groups of media items, and displaying the two or more groups of media items on the display device.

In still another aspect, the invention involves a system for obtaining and displaying a single set of media search results from a search of each of a plurality of media sources. The system includes an input module configured for receiving a media search query, a search module configured for executing a search of each of the plurality of media sources for media based on the received media search query, and a consolidating module configured for consolidating the results of each of the plurality of searches into the single set of media search results, which include a list of media items, where each of the listed media items have associated metadata. The system further includes a grouping module configured for organizing the media items into two or more groups. Each of the two or more groups included media items having similar content. The similarity of the content of the media items is defined by the media items' associated metadata meeting or exceeding a metadata matching threshold. The system further includes a sorting module configured for sorting the two or more groups of media items with respect to each other, and sorting the media items within each of the two or more groups of media items, a display device, and a presenting module configured for displaying the grouped single set of media search results on the display device.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

FIG. 7 is an illustrative diagram of a search query input screen (graphical user interface) used for entering search terms into the media search device of FIG. 1

LIST OF REFERENCE NUMBERS FOR THE MAJOR ELEMENTS IN THE DRAWING

Figure 1:
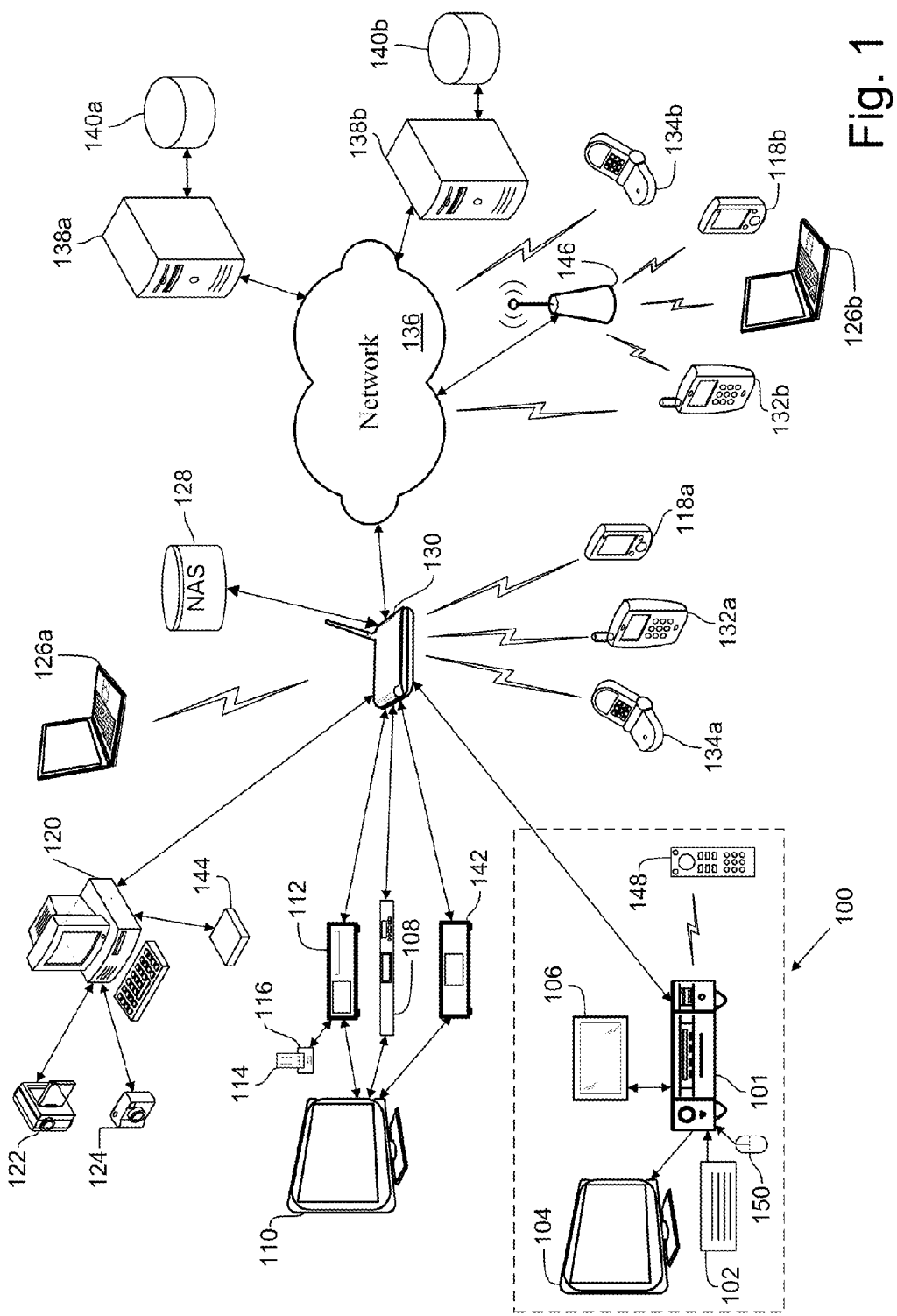
FIG. 1 is an illustrative schematic diagram of a media search system in communication with various media sources, according to one embodiment of the invention.

The following is a list of the major elements in the drawings in numerical order.
  100 media search system
  101 media search device
  102 keyboard
  104 display
  106 touch panel
  108 digital video recorder
  110 television
  112 home theater personal computer
  114 mp3 player
  116 mp3 docking station
  118a personal data assistant
  118b personal data assistant
  120 personal computer
  122 digital video camera
  124 digital still image camera
  126a laptop/notebook computer
  126b laptop/notebook computer
  128 network attached storage
  130 router
  132a smart phone
  132b smart phone
  134a cell phone
  134b cell phone
  136 network
  138a remote server
  138b remote server
  140a remote media storage
  140b remote media storage
  142 DVD or Blu-Ray disc changer
  144 local external hard drive
  146 access point
  148 remote control device
  150 pointing device
  301 chassis
  302 main processor board
  304 volatile random access memory
  308 processor
  309 video processor
  310 mass storage device
  312 power supply
  314 CD/DVD drive
  316 video card
  318 sound card
  320 LAN card
  322 touch panel card
  324 monitor connector
  326 audio connector
  328 LAN connector
  330 touch panel connector
  332 keyboard connector
  334 pointing device connector
  336 power supply connector
  338 mass storage device connector
  340 control dial
  342 LCD panel
  344 control buttons
  346 control panel
  348 control panel connector
  350 A/C connector
  402 processor
  404 processor
  406 processor
  408 processor
  410 processor
  412 processor
  414 processor
  416 processor
  418 processor
  500 search mechanism 502 input control module
506 display control module
508 playback module
510 presenting module
512 consolidating module (aggregator)
514 searching module (indexer)
518 sorter module
520 filter module
522 grouping module
602 enter media search query
604 execute search of plurality of media sources
606 generate results of the search of the plurality of media sources
608 consolidate the results of the plurality of search into a single set of search results
610 group the single set of search results into two or more groups
612 filter the single set of search results
614 sort the groups and the media items within each group in the single set of search results
616 present/display the grouped, filtered, and sorted single set of search results
700 search query input screen (GUI)
702 search term input field
704 match filter
706 match filter selection
708 match filter drop down button
710 search in filter
712 search in filter selection
714 search in filter drop down button
716 media type filter
718 media type filter selection
720 media type filter drop down button
722 run time filter
724 run time filter selection
726 run time filter drop down button
728 sort 1
730 sort 1 option selection
732 sort 1 option drop down button
734 sort 2
736 sort 2 option selection
738 sort 2 option drop down button
740 search for button
742 load saved search query button
744 load saved search results button
802 search query
804 keyword
806 all
808 video
810 movie
812 resolution
814 QoS
902 image representing content of group 1
904 image representing content of group 2
906 sorted and filtered list of content group 1
908 sorted and filtered list of content group 2
910 save search query button
912 save search results button
914 transformers title
916 transformers—revenge of the fallen title
918 content group 1
920 content group 2

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

MODE(S) FOR CARRYING OUT THE INVENTION

The present invention involves a system and method that enable a user to search for various media from two or more media sources (i.e., devices or websites that store or provide digital audio, video, and/or still images), such as online media libraries, online video rental services, and/or the user's own media library.

The search results from each of the two or more media sources are consolidated into a single set of search results. The single set of search results are grouped, filtered, and sorted according to various criteria, which will be described in detail below. The grouped, filtered, and sorted single set of search results is then presented to the user. Thereafter, the user can further filter and/or sort the single set of search results or select from the search results the media to be viewed. The media can then be viewed on the user's private display device (e.g., PDA, cell phone), or on display device, such as a television, that allows the media to be viewed by several people.

Figure 2:
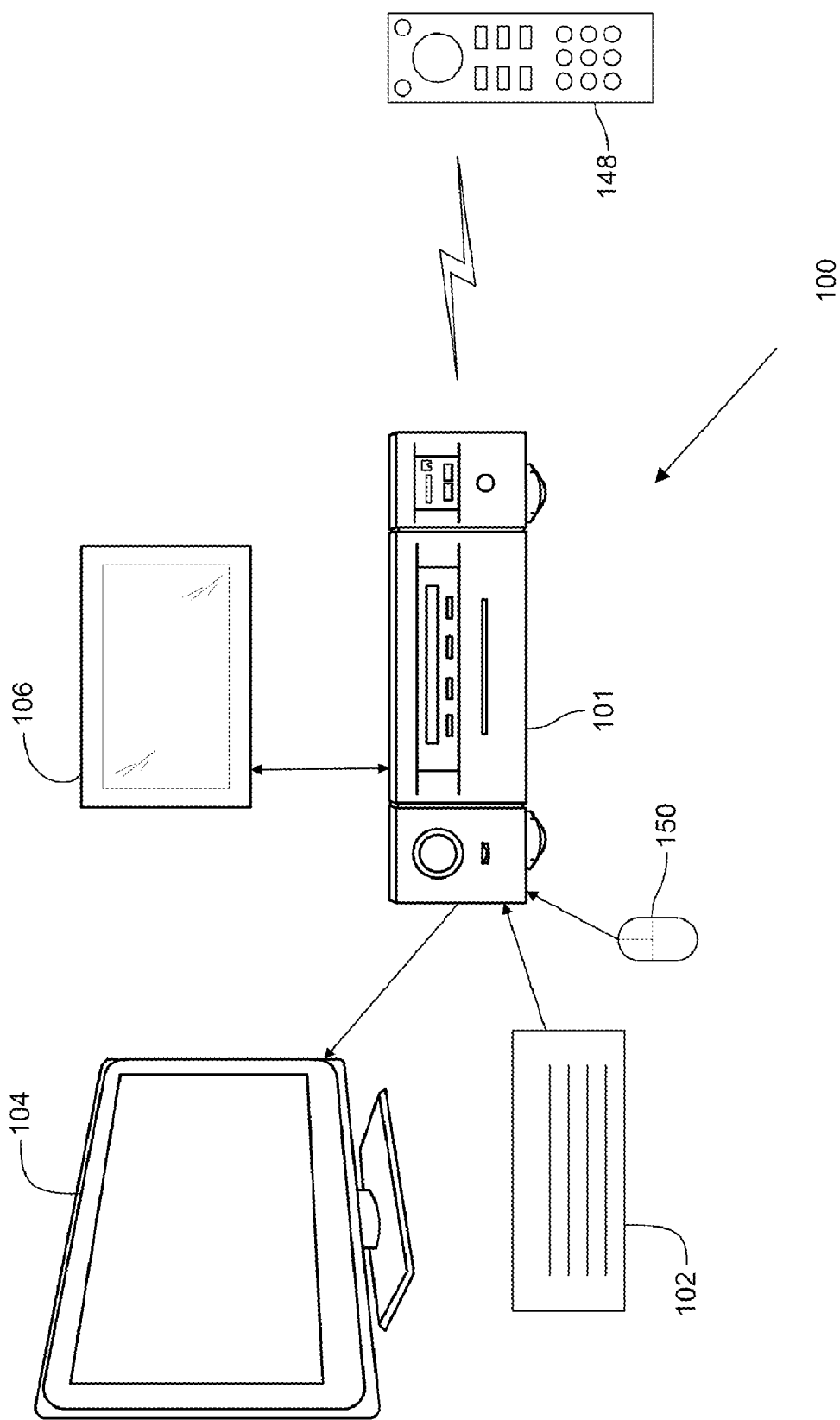
FIG. 2 is an illustrative drawing of the media search system of FIG. 1.

Referring to FIG. 1, in one embodiment, a schematic diagram of a media search system 100 in communication with a variety of devices capable of storing or displaying media is shown. The media search system 100 includes a media search device 101, a wired or wireless keyboard 102 and a wired or wireless pointing device (e.g., mouse 150) for data and query entry, and a display 104 (e.g., an LCD monitor or television) for viewing search results and viewing selected media (see also FIG. 2).

In another embodiment, the media search system 100 includes the media search device 101, the monitor 104 for viewing media, and a touch panel 106 (also shown in FIG. 2), which is used for data and query entries, and viewing search results. The touch panel 106 includes various touch controls and a virtual keyboard for alphanumeric data entry, as is known to those skilled in the art. In still another embodiment, the touch panel 106 is also used for viewing media playback.

In still another embodiment, the media search system 100 includes a remote control device 148, which is used to configure and control the media search device 101 by methods known to those skilled in the art.

Referring again to FIG. 1, the media search device 101 is in communication with a plurality of media sources. Generally, a "media source" is any electronic device that stores or provides digital audio, video, and/or still images, such as a local hard drive or digital video recorder. A "media source" also includes any media provider, such as Youtube®, iTunes®, Hulu®, Amazon Video on Demand®, or Netflix®, that provides media over a network. The media can be downloadable or streaming, and can be free, rented, or purchased.

Media sources local to the media search device 101 include, but are not limited to, a digital video recorder 108, a home theater personal computer (HTPC) 112, a DVD/Blu- Ray disc changer 142 (each connected to a television 110), an mp3 docking station 116 (in communication with an mp3 player 114), personal data assistant (PDA) 118a, a personal computer (PC) 120, a digital video camera 122, a digital still image camera 124, a laptop/notebook computer 126a, a network attached storage (NAS) 128, smart phone 132a, cell phone 134a, and a local external hard drive 144.

Media sources remote from the media search device 101 include, but are not limited to, remote server 138a, remote media storage 140a, remote server 138b, remote media storage 140b, laptop/notebook computer 126b, PDA 118b, smart phone 132b, and cell phone 134b. In other embodiments, the media search device 101 can be in communication with more or less media sources.

The media sources local to the media search device 101 are in communication with the media search device 101 via wired or wireless connections through a router 130 in a home or local area network (LAN). Further, the PDA 118a, smart phone 132a, and cell phone 134a can be in communication with the media search device 101 via Bluetooth communication.

The remote server 138a, remote media storage 140a, remote server 138b, and remote media storage 140b are in communication with the media search device 101 via the network 136 and router 130. The laptop/notebook computer 126b, PDA 118b, smart phone 132b, and cell phone 134b are in communication with the media search device 101 via wireless communication (e.g., WiFI) with the network 136 though an access point 146. The laptop/notebook computer 126b, PDA 118b, smart phone 132b, and cell phone 134b can also be in communication with the media search device 101 via a 3G network.

In some embodiments, any of the above-described devices that include a screen can be used to play back selected media.

Figure 3:
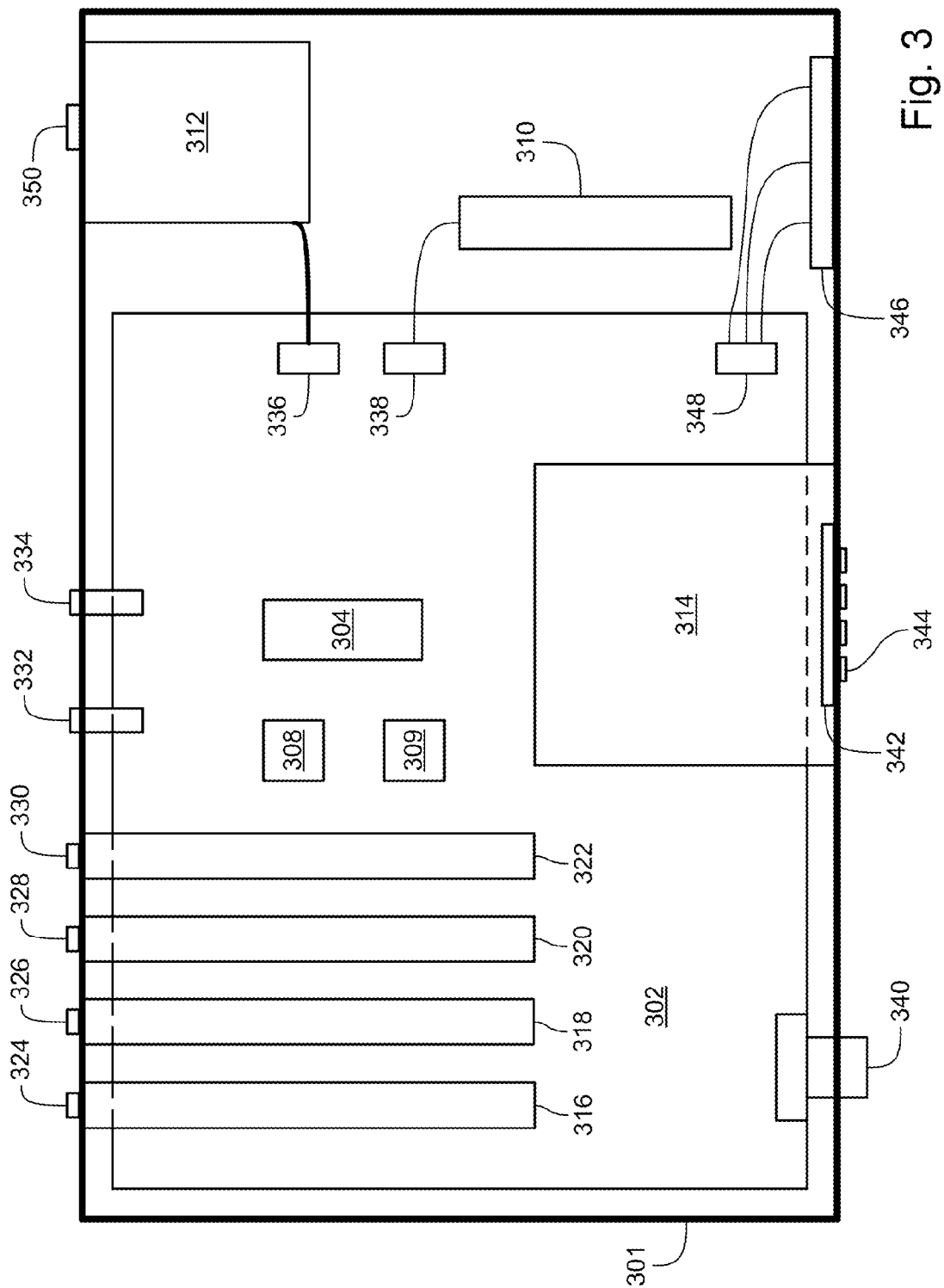
FIG. 3 is an illustrative schematic diagram of the media search device of FIG. 2.

Referring to FIG. 3, in one embodiment, a schematic diagram of the media search device 101 is shown. The media search device 101 includes a main processor board 302 (e.g., an Intel motherboard), which includes volatile random access memory (VRAM) 304, a main processor 308, a keyboard connector 332, a pointing device connector 334, a power supply 312 with an A/C connector 350, a mass storage device (e.g., a Seagate hard disk) 310, and CD/DVD drive 314. The main processor 308 is configured to execute all of the media search functions, which are described in detail below.

The power supply 312 is connected to the main processor board 302 via connector 336 and the hard disk 310 is connected to the main processor board 302 via connector 338.

The media search device 101 further includes at least one of a video card 316 (e.g., an ATI video card) with a video connector 324 and/or a dedicated video processor 309 disposed on the main processor board 302. The media search device 101 further includes a sound card 318 with a audio connector 326, a LAN card 320 with a LAN connector 328, and a touch panel interface card 322 with a touch panel connector 330. The various cards are seated in card slots (not shown) disposed on and connected to the main processor board 302.

The media search device 101 still further includes a control knob 340, an LCD screen 342, control buttons 344, and a control panel 346 each connected to the main processor board 302. The control panel 346 is connected to the main processor board 302 via connector 348. In other embodiments, more or less controls are included.

The above-described components are all disposed in, or on, a chassis 301.

Figure 4:
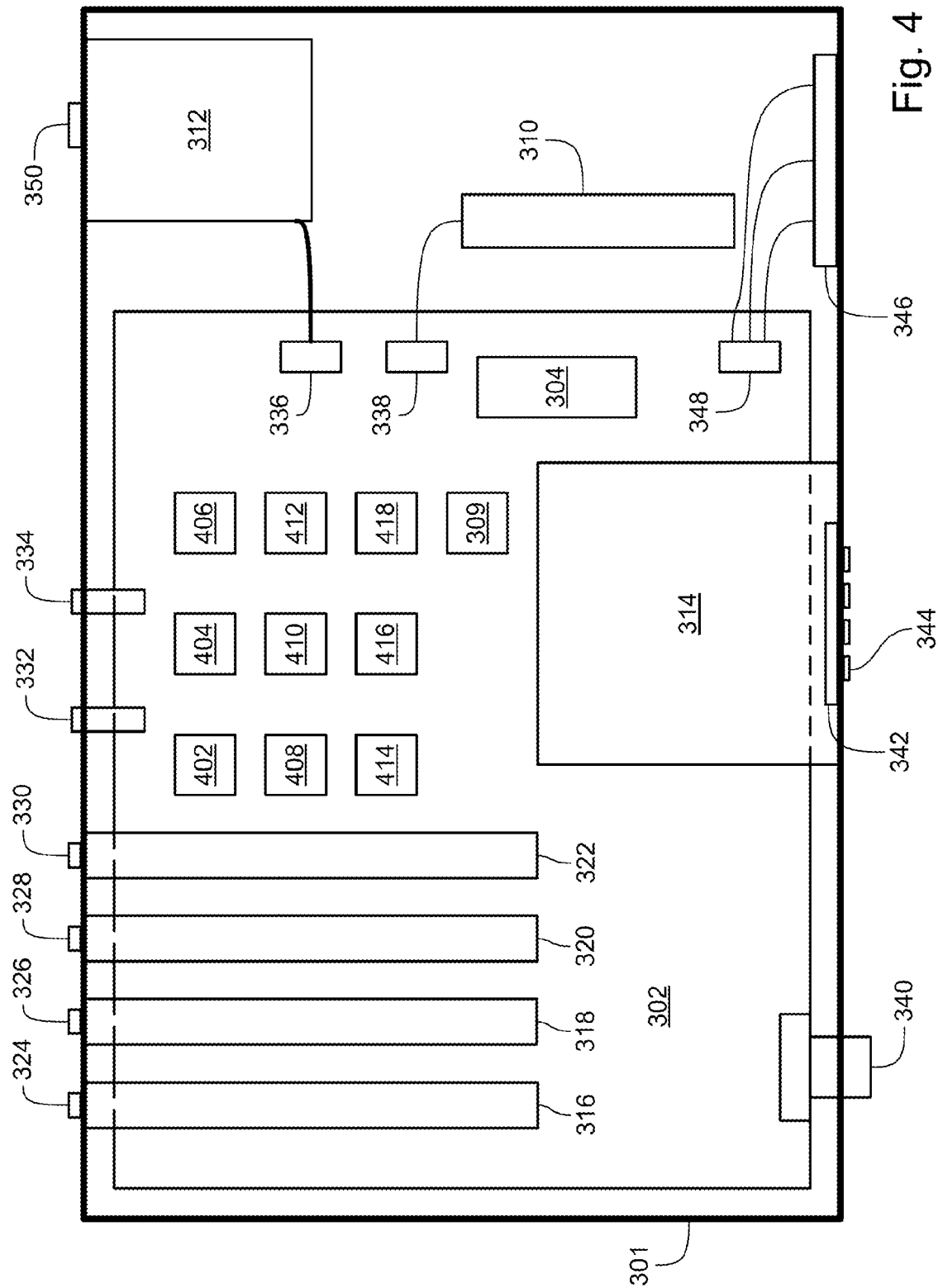
FIG. 4 is an illustrative schematic diagram of a media search device, according to another embodiment of the invention.

Referring to FIG. 4, in another embodiment, the processor board 302 includes a plurality of processors 402, 404, 406, 408, 410, 412, 414, 416, 418 instead of the single processor 308. In this embodiment, each processor is configured to execute a particular function or part of the complete media search process, which is described in detail below.

Figure 5:
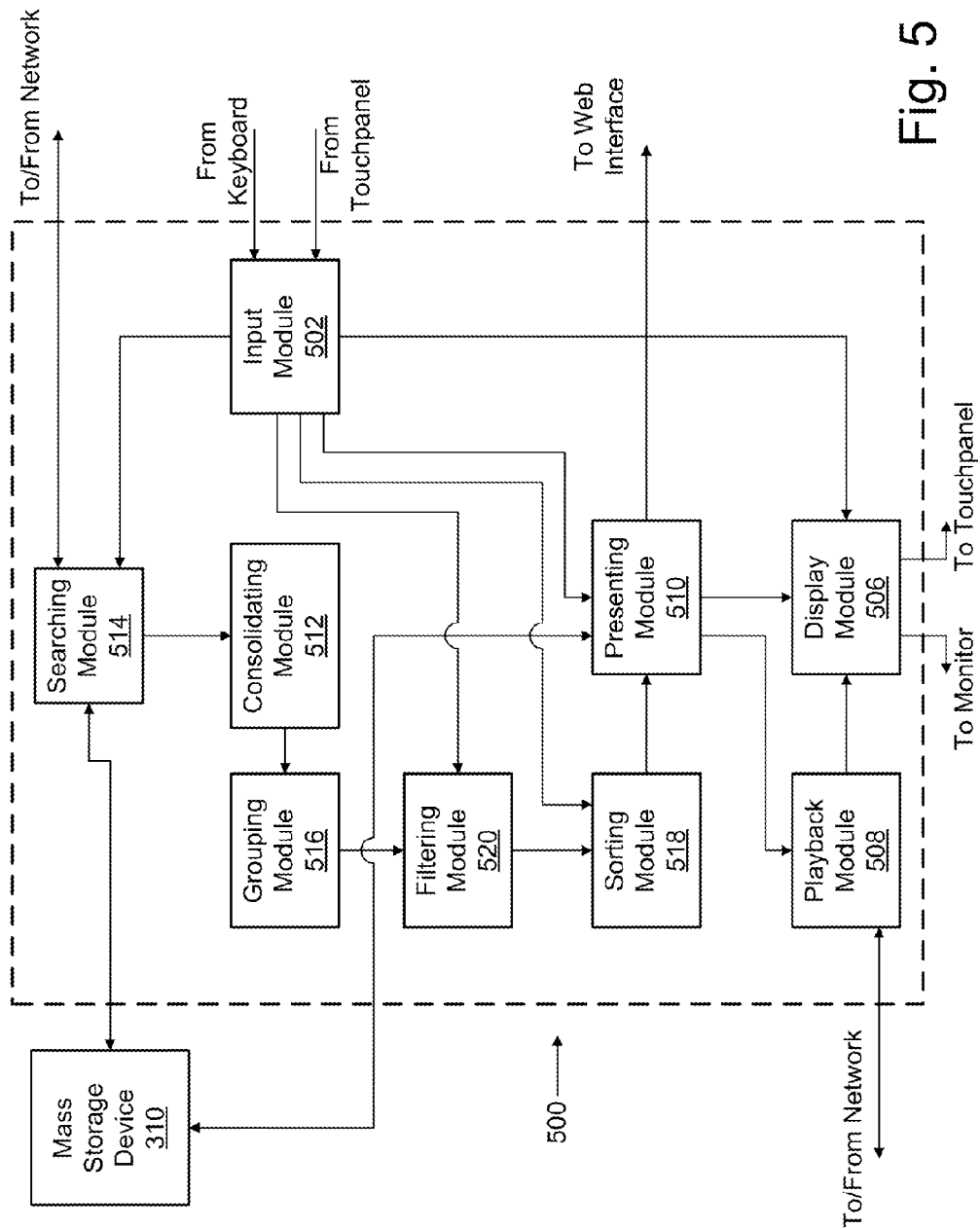
FIG. 5 is an illustrative block diagram of the search mechanism of the media search device of FIG. 2.
Figure 6A:
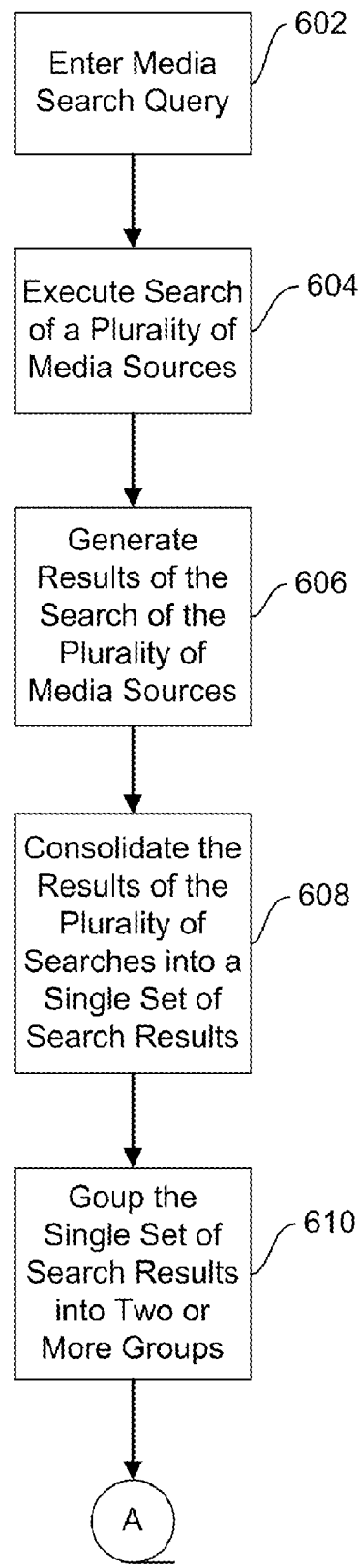
FIGS. 6A and 6B are illustrative flow diagrams of a search, group, filter, sort, and display process using a media search device, according to one embodiment of the invention.
Figure 6B:
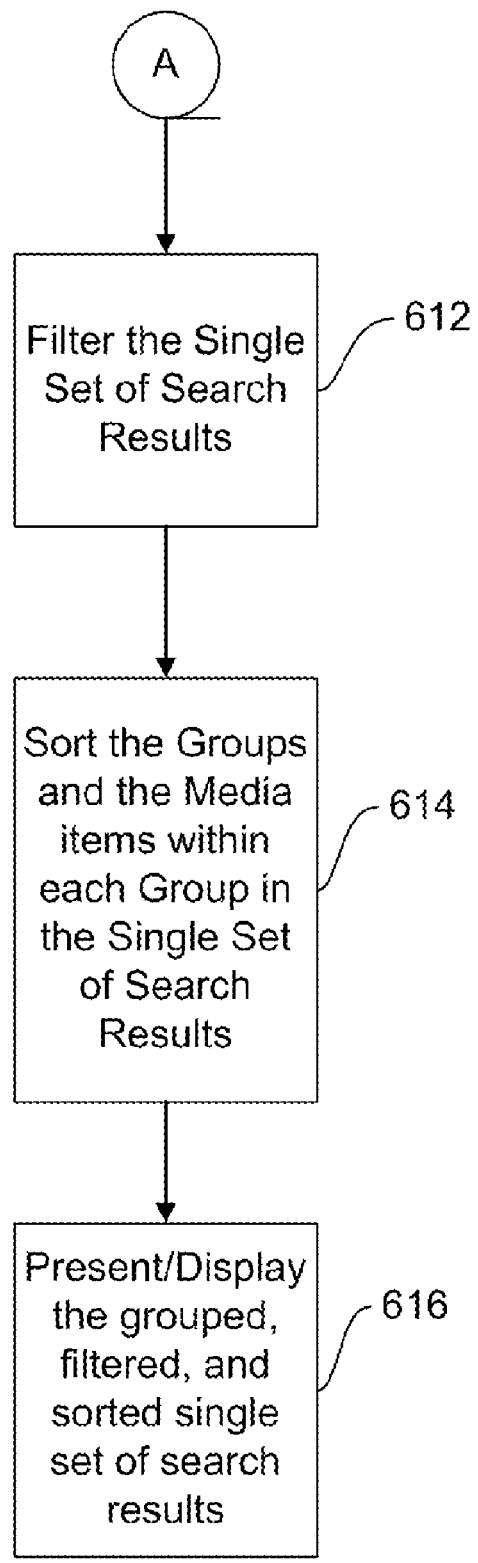

Referring to FIG. 5, in one embodiment, a block diagram of the search mechanism 500 of the media search device 101 is shown. The search mechanism 500 includes an input control module 502, display control module 506, a playback module 508 (playback engine), a presenting module 510, a consolidating module 512 (aggregator), and searching module 514 (indexer), a grouping module 516, a sorting module 518, and a filter module 520. Each of the modules 502, 506, 508, 510, 512, 514, 516, 518, 520 is discussed in detail below.

The input control module 502 (which includes a graphical user interface such as that shown in FIG. 7) receives user input from the keyboard 102 and mouse 150 or touch panel 106 and enables a user to input a media search term, select filtering and sorting options, select a particular media for viewing, and select the particular display device on which the selected media is to be viewed. The method of selecting the particular display device on which the media is to be viewed is beyond the scope of this invention.

The searching module 514 (indexer) is in communication with the router 130 and includes a meta search engine, which is configured to interact with various media provider search programs/interfaces. The searching module 514 meta search engine receives the media search term(s) from the input control module 502 and passes the media search term(s) to the various media provider search interfaces, which may include, but are not limited to, Youtube®, iTunes®, Hulu®, Amazon Video on Demand®, Netflix®, and a local search engine that searches local hard drives and/or other local media sources/devices.

For example, if a user enters the search term "lost in space", into the input module 502. The input module 502 passes the search term/phrase "lost in space" to the search module 514. The search module 514 meta search engine the passes the search term "lost in space" to the various media provider interfaces.

Each of the media provider interfaces searches the associated media provider's media database or media storage device (e.g., user's internal and external hard drives, and/or the user's iPod®/MP3 player, and/or the user's DVR and DVD/Blu-Ray changer) for any media matching the input media search term(s). Other local media sources, such as those shown in FIG. 1, can also be searched as long as they are in wired or wireless communication with the media search device 101. Each of the media provider interfaces that locates at least one media item matching the input search term(s) returns a separate set of search results that includes a uniform resource locator (URL) or a local disk path (e.g., c:\user\my media) for each found media item.

Continuing with the above example, each of the media provider interfaces that locate any media (i.e., video, audio, and/or images) that match the entered search term "lost in space" returns a separate set of search results that includes the location (i.e., URL or disk path) of each media item related to "lost in space".

The searching module 514 collects the separate search results from each of the media provider interfaces and passes the separate search results to the consolidating module 512. The searching module also stores in, and retrieves from, the mass storage device 310 various information (i.e., raw search data) associated with each of the media items (i.e., video, audio, and/or images) matching the input search query. Such information includes metadata associated with each of the media items matching the search query, and is discussed in detail below.

The consolidating module 512 (aggregator) consolidates the separate sets of search results (i.e., the search results retrieved from each of the various provider interfaces) provided by the searching module 514 into a single set of search results (i.e., a single list of media items), and passes this single set of search results to the grouping module 516.

As with each of the separate sets of search results, the consolidated single set of search results includes all the locations (URLs and disk paths) at which each of the particular listed media items were found.

Continuing the above example, if three media items (i.e., any video, audio, and/or images) matching the search term (i.e., key phrase) "lost in space" were found in each of five different locations (e.g., stored at remote media providers and/or in local drives), all fifteen media items related to "lost in space" and the associated media item locations would be listed in the single set of search results.

After the plurality of sets of search results are consolidated into a single set of search results, the consolidating module passes the single set of search results to the grouping module.

As mentioned above, the searching module 514 stores, in the mass storage device 310, metadata associated with each of the media items listed in the single set of search results. The metadata that is associated with a particular media item includes data that comprises information that describes the contents or attributes of that particular media item. Examples of metadata include, but are not limited to, title, subject, artist, creator, director, cast, composer, description, genre, type, filename, source, publisher, format, date of production, running time, and language. Sources of metadata include web page content, uniform resource locators (URLs), headers and/or trailers of media files, and transport streams used to transmit media files. Web page content includes HTML, XML, metatags, and any other text on the web page.

The grouping module 516 analyzes the metadata associated with each of the media items listed in the single set of search results and groups the listed media items according to the media item's content.

Continuing the above example, if five of the listed fifteen media items are related to (i.e., have the content) "Lost in Space" the movie, five of the listed media items are related to "Lost in Space" episode one, and five of the listed media items are related to "Lost in Space" episode two, the grouping module 516 groups the fifteen media items into three groups. Specifically, the grouping module 516 groups the five media items related to "Lost in Space" the movie into a first group, the five media items related to "Lost in Space" episode one into a second group, and the five media items related to "Lost in Space" episode two into a third group.

When analyzing/examining the metadata of a particular media item to determine if the particular media item belongs to a particular group (i.e., has or is related to a particular content), the grouping module uses heuristic analysis and preset metadata matching criteria. In other words, the grouping module determines if the media item's associated metadata reaches a predetermined metadata matching threshold.

Continuing with the above example, if the metadata for five of the fifteen "Lost in Space" media items were as follows: title="Lost in space"; date of production="1998"; genre="science fiction"; and company="New Line Cinema", then each of the those five media files would be grouped together as having the same content (i.e., related to the movie "Lost in Space").

Similarly, based on analysis of the associated metadata, the media items related to (have the content) "Lost in Space" episode one, and the media items related to "Lost in Space" episode two, would be grouped into two additional and separate groups, respectively, because the respective media items' associated metadata would be different from each other, and different from the metadata associated with the media items having the content "Lost in Space" the movie.

After the grouping is completed, the grouping module 516 passes the single set of search results, which includes the three separate media item groups, to the filtering module 520.

The filtering module 520 is user controllable and filters (i.e., determines what is presented in/eliminated from) the single set of media search results (listed media items) and/or the search results (listed media items) within at least one of the groups of search results according the user's preferences. For example, the media items listed in the search results may be filtered by: media type (e.g., all types, only video, only audio, or only images); the level of matching of the input search term(s) (e.g., search for keyword(s), exact phrase, Boolean search, etc.); run time of the media (e.g., any run time, only short videos, only full episodes, or only full length movies, etc); and where the user cares to look for the desired media (e.g., all locations, only in the user's media library, only from sites that have media for purchase or rental, only from cable or internet TV, etc). In other embodiments, in addition to, or instead of the above filters, the media items can be filtered according to other criteria, such as date, for example, or according on any other available metadata. After filtering is completed, the filtering module 520 passes the grouped and filtered set of search results to the sorting module 518.

Continuing with the above example, assuming that two of the listed items of the group of media items having the content "Lost in Space" the movie were located on the user's hard drive and the in the user's DVD changer, respectively, and the other three listed media items were each located on various remote video rental sites, and the user wished to only see videos located in his/her video library, the three media items located on various remote video rental sites would be eliminated. The group would then only include two video media items.

In one embodiment, the sorting module 518 is user controllable and sorts the groups of media items with respect to each other and also sorts the media items within each of the groups according to the user's preferences. For example, groups of media items, or media items within groups can be sorted by resolution; Quality of Service (i.e., the bandwidth at which the file can be download or streamed); or purchase options (e.g., free, rental, purchase). In other embodiments, in addition to, or instead of the above sorting options, the media items can be sorted according to other criteria, such as date, for example, or according to any other available metadata. In still another embodiment, the sorting criteria is preset by the manufacturer and the sorting of the groups and the sorting of the search results within groups occur automatically and transparent to the user. After sorting is completed, the sorting module 518 passes the grouped, filtered, and sorted set of search results to the presenting module 510.

Continuing with the above example, if one video of "Lost in Space" the movie were located on the user's hard drive, while the videos of "Lost in Space" episode one and episode two were only available from remote providers via streaming video, and the user chose to sort the groups by quality of service, the group having the content "Lost in Space" the movie would be listed first since the quality of service would be the greatest for a video located on the user's hard drive.

Further, if the group having the content "Lost in space" the movie included one video with a high definition resolution and one video with a low resolution, and the user chose to sort the videos by resolution, the video having the high definition resolution would be listed first.

The presenting module 510 puts the search results in a presentable (i.e., user-readable) form and passes the search results to the display module 506, which displays the search results on a display for the user to view. The presenter also stores/retrieves a search query or search results to/from the mass storage device 310.

The display module 506 is in communication with one or more displays (e.g., display 104) and the touch panel 106. The display module 506, under direction from the presenting module 510, displays the search results in content groups as described above. Each group is displayed with an associated image that represents the particular content of the group.

Continuing with the above example, the group "Lost in Space" the movie would be displayed along with an image of the movie poster or DVD box cover art. This group would also include a list of all the links to the particular video filtered according to the user's preferences and sorted according to user selected or preselected preferences, as described above.

After the search results are presented to the user on the display 104 (or the touch panel 106), the user has the option of resorting the list, re-filtering the list, adding filtering criteria, saving the search results and/or the query to the hard disk 310, executing a new search, and/or selecting a particular media from a particular content group for viewing.

If the user selects a particular media (e.g., video) for viewing, the user simply selects the media item by clicking on the associated link with the pointing device 150 or via the touch panel 106. For example, if the user wishes to view "Lost in Space" the movie from Netflix®, the user simply clicks on the Netflix® link.

If the selected media is to be purchased or rented, the presenting module 510 interacts with a web/internet interface (i.e., a web browser) and the user is connected to the particular media provider's website for payment and download or streaming of the media. Once the media has been made available for viewing (i.e., selected, paid for, downloaded, etc.), the presenting module 510 instructs the playback module 508 (playback engine) to playback the selected media on the display device (e.g., display 104).

If the selected media is free (e.g., stored on the user's hard drive or DVR, or available for free streaming or download from a media provider), the presenting module 510 instructs the playback module 508, which is communication with the router 130, to retrieve and playback the selected media. As mentioned above, prior to actually viewing the media, the user has the option of selecting on which display device the media is to be viewed.

In one embodiment, the modules 502, 506, 508, 510, 512, 514, 516, 518, 520 are implemented using C and C++ and executed on the main processor 308 (FIG. 3). In another embodiment, the modules 502, 506, 508, 510, 512, 514, 516, 518, 520 are executed on separate processors 402, 404, 406, 408, 410, 412, 414, 416, 418 (FIG. 4).

Referring to FIG. 7, in one embodiment, a diagram of a search query input screen 700 (graphical user interface) used for entering search terms into the input module 502 of the media search device 101 is shown. The input screen 700 includes a search term input field 702, a "match" filter 704, a "search in" filter 710, a "media type" filter 716, a "run time" filter 722, a "sort 1" option 728, a "sort 2" option 734, a "search for" button 740, a load saved search query button 742, and a load saved search results button 744.

The "match" filter 704 includes a "match" filter selection 706, which indicates the currently selected "match" filter, and a "match" filter drop down button 708, which, when clicked on, shows a drop down menu of other available "match" filters. In one embodiment, "match" filters 704 include: keyword(s), exact phrase, and Boolean search. In other embodiments, more or less "match" filters 704 are available.

The "search in" filter 710 includes a "search in" filter selection 712, which indicates the currently selected "search in" filter, and a "search in" filter drop down button 714, which, when clicked on, shows a drop down menu of other available "search in" filters. In one embodiment, "search in" filters 710 include: all locations, only in the user's media library, only from sites that have media for purchase or rental, and only from cable or internet TV. In other embodiments, more or less "search in" filters 710 are available.

The "media type" filter 716 includes a "media type" filter selection 718, which indicates the currently selected "media type" filter, and a "media type" filter drop down button 720, which, when clicked on, shows a drop down menu of other available "media type" filters. In one embodiment, "media type" filters 716 include: all types, only video, only audio, or only images. In other embodiments, more or less "media type" filters 716 are available.

The "run time" filter 722 includes a "run time" filter selection 718, which indicates the currently selected "run time" filter, and a "run time" filter drop down button 720, which, when clicked on, shows a drop down menu of other available "run time" filters. In one embodiment, "run time" filters 722 include: any run time, only short videos, only full episodes, or only full-length movies. In other embodiments, more or less "run time" filters 722 are available.

The "sort 1" option 728 includes a "sort 1" selection 730, which indicates the currently selected "sort 1" option/choice, and a "sort 1" drop down button 732, which, when clicked on, shows a drop down menu of other available "sort 1" options. In one embodiment, "sort 1" options 728 include: resolution; Quality of Service (i.e., the size of the file and bandwidth at which the file can be download or streamed); or purchase options (e.g., free, rental, purchase). In other embodiments, more or less "sort 1" options 728 are available. The sort 1 option 728 is used to sort the two or more groups relative to each other.

The "sort 2" option 734 includes a "sort 2" selection 736, which indicates the currently selected "sort 2" option/choice, and a "sort 2" drop down button 738, which, when clicked on, shows a drop down menu of other available "sort 2" options. In one embodiment, "sort 2" options 734 also include: resolution, Quality of Service, or purchase options. In other embodiments, more or less "sort 2" options 734 are available. The sort 2 option 734 is used to sort the media items within each group of media items.

The "search for" button 740, when pressed or clicked on, executes a search for media matching the search term(s) in the search term input field 702.

The load saved search query button 742, when pressed or clicked on, presents the user with a list of previously saved search queries. The user can thereafter select a previous search query and execute a search.

The load saved search results button 744, when pressed or clicked on, presents the user with a list of previously saved search results. The user can thereafter select a previously obtained set of search results and select a media to view therefrom.

Referring to FIGS. 1, 5-7, and 8, in one embodiment, in operation, a user wishing to locate particular media, such as media relating to "Transformers", enters the search query (i.e., keyword or phrase) "Transformers" 802 into the search term input field 702 (see FIG. 8) via the touch panel 106 or the keyboard 102 (Step 602).

After entering the search query, but prior to executing the search, the user also selects various filter and sort options. In the example shown in FIG. 8, the "match" filter 704 is set to "keyword" 804, the "search in" filter 710 is set to "all" 806, the "media type" filter 716 is set to "video" 808, and the "run time" filter 722 is set to "movie" 810 using the various drop down menus described above.

Based on the above filter settings, the returned set of search results will be filtered to show only videos from all media locations, that have a title that includes the term "transformers", and that are of movie length.

Figure 8:
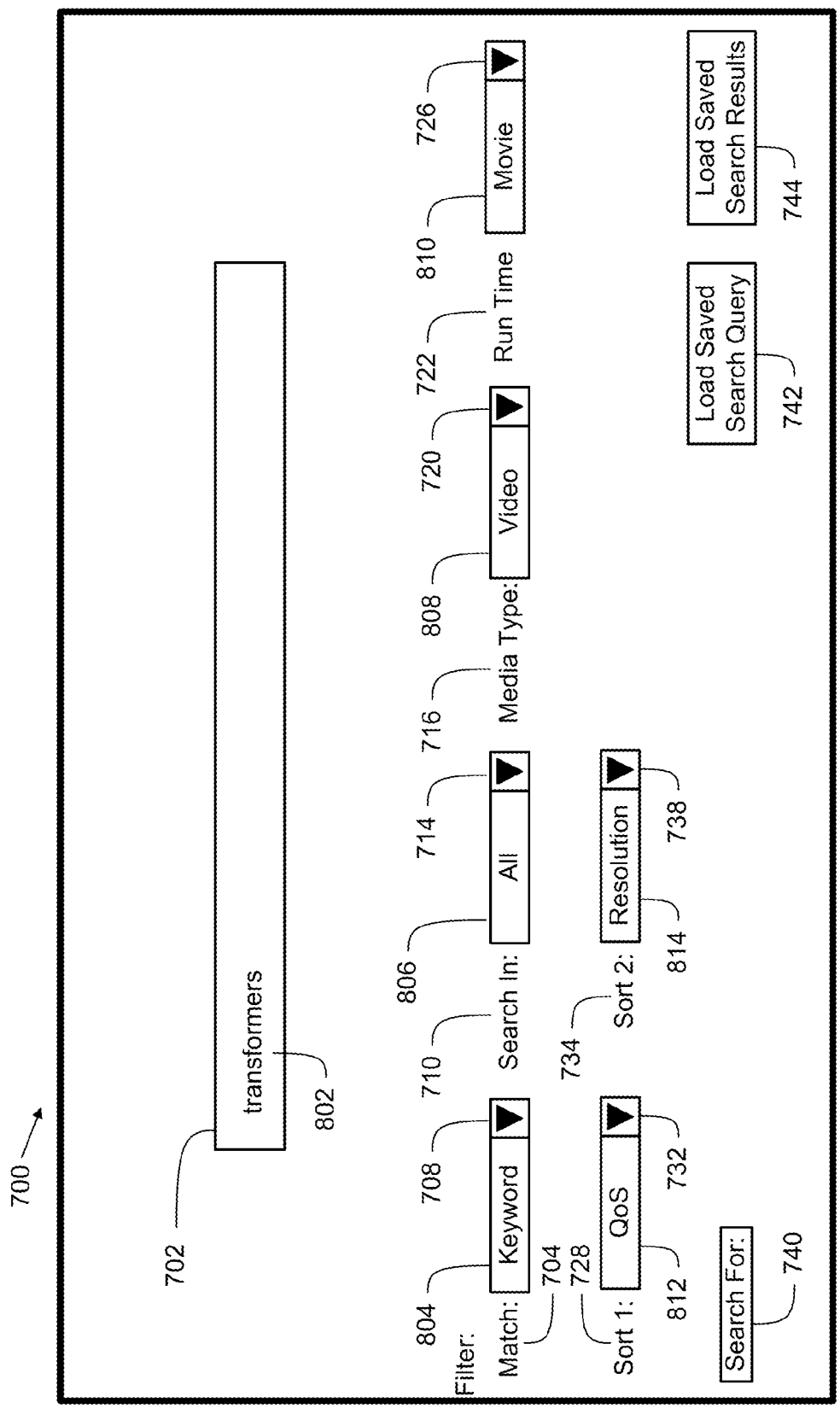
FIG. 8 is an illustrative diagram of the search query input screen of FIG. 7 including an entered search query/keyword, selected filters, and selected sort options.

Further, as also shown in FIG. 8, the "sort 1" option 728 is set to "QoS" 812 and the "sort 2" option 734 is set to "resolution" 814. Consequently, the groups of media items that are returned in the set of search results will be sorted with respect to each other according to quality of service, and the media items with each group will be sorted according to resolution.

The user then executes the search by pressing an "enter" or "execute" key, or clicking the "search for" button 740.

In response to the user executing the search, the searching module 514 (indexer) receives the search query (i.e., media search term) from the input control module 502. The searching module 514 meta search engine passes the search term "transformers" to all provider interfaces and local search engines (Step 604). The provider interfaces and local search engines search the corresponding media providers and local media storage devices for any media that includes the word "transformers". The searching module 514 collects the separate search results from each of the provider interfaces and local search engines (Step 606) and passes these search results to the consolidating module 512, which generates a single set of search results (Step 608).

The consolidating module 512 passes the single set of search results to the grouping module 516. The grouping module 516 groups the various media listed in the single set of search results according to media content (Step 610), as described in detail with respect to FIG. 5. In other words, all media related to the same topic (i.e., having similar content defined by a metadata matching threshold) are grouped together. The grouping module then passes the grouped set of search results to the filter module 520.

The filtering module 520 then filters the groups within the complete single set of search results according to the criteria input by the user on the search query input screen 700, as described above (Step 612). The filtering module 520 then passes the grouped and filtered list of search results to the sorting module 518.

The sorting module 518 sorts the groups of media items, and sorts the media items within groups according to the criteria input by the user on the search query input screen 800 (Step 614). Specifically, the sorting module 518 sorts the groups with respect to each other according to the "sort 1" option, which is set to quality of service. The sort module 518 also sorts the media items within each of the groups according to the "sort 2" option, which is set to resolution. The sorting module 518 then passes the grouped, filtered, and sorted list of search results to the presenting module 510.

The presenting module 510 puts the grouped, filtered, and sorted list of search results in a presentable (i.e., user-readable) form and passes the search results to the display module 506, which displays the search results on a display (e.g., display 104) for the user to view (Step 616).

Figure 9:
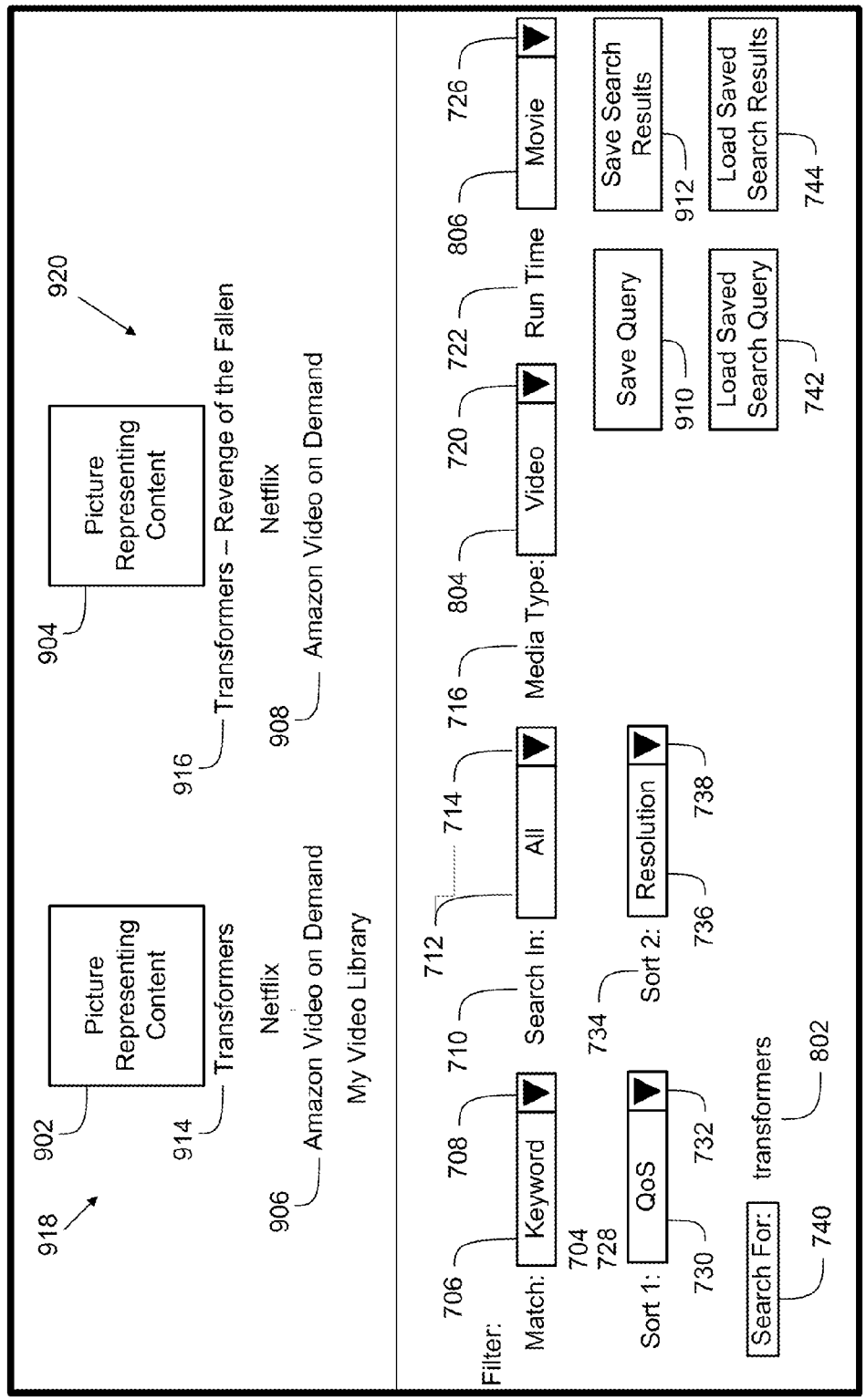
FIG. 9 is an illustrative diagram of a search results screen including search results for the search query of FIG. 8.

Referring to FIG. 9, a search results screen 900 including a list of grouped, filtered, and sorted search results for the search query of FIG. 8 is shown. The search results screen 900 particularly includes video group 918 and video group 920. Group 918 includes content related to the movie "Transformers" 914 and group 920 includes content related to the movie "Transformers—Revenge of the Fallen" 916. Each content group 914 and 916 has an associated image 902 and picture 904, respectively, which represents the content of the particular group. For example, the picture 902 might be a picture of the cover art for the "Transformers" DVD, and the picture 903 might be a picture of the cover art for the "Transformers—Revenge of the Fallen" DVD.

Group 918 includes a filtered and sorted list of media sources 906 from which the content associated with group 918 can be obtained. Likewise, group 920 includes a filtered and sorted list of media sources 908 from which the content associated with group 920 can be obtained. Specifically, the content associated with group 918 (i.e., the movie "Transformers") can be obtained from Netflix®, Amazon Video on Demand®, and the user's video library (e.g., stored on the user's hard disk). Further, the content associated with group 920 (i.e., the movie "Transformers—Revenge of the Fallen) can be obtained from Netflix®, and Amazon Video on Demand®.

Because the "sort 1" option was set to QoS, the group 918 with the content "Transformers" is listed first since one video is located on the user's hard drive, which has a better quality of service as compared to downloading or streaming video from a remote provider, which are the only options for the videos in the group 920. Further, the videos available from Netflix® have the highest resolution, and are thus listed first within each group 918 and 920. In another embodiment, the sorted list of media sources 906 and the sorted list of media sources 908 each include sorting details for each entry. For example, each entry on the respective lists 906 and 908 might include the video resolution, the video quality of service, and/or the video purchase options.

The search results screen 900 further includes a save search query button 910, which allows the user to save the current search query to the mass storage device (hard disk) 310. The search results screen 900 still further includes a save search results button 912, which allows the user to save the current search results to the mass storage device (hard disk) 310.

The search results screen 900 still further includes the search query 802 disposed next to the "search for" button 740 in order to remind the user what terms were used for the search.

As previously described above, after the grouped, filtered, and sorted search results are displayed on the display 104, the user can select a particular media for viewing.

If the selected media is to be purchased or rented, the presenting module 510 interacts with a web/internet interface (i.e., a web browser) and the user is connected to the particular media provider's website for payment and download or streaming of the media. Once the media has been made available for viewing (i.e., selected, paid for, downloaded, etc.), the presenting module 510 instructs the playback module 508 (playback engine) to playback the selected media on the display device (e.g., display 104).

If the selected media is free (e.g., stored on the user's hard drive or DVR, or available for free streaming or download from a media provider), the presenting module 510 instructs the playback module 508, which is communication with the router 130, to retrieve and playback the selected media.

If the search results are too long, the user has the option of further filtering the search results using the procedure described above. Likewise, the user also has the option of re-sorting the groups of media items with respect to each other, or re-sorting the media items within a particular content group.

Additionally, the user can choose to conduct a new search by clicking on the "search for" button 740. This action returns the user to search query input screen 700.

In another embodiment, the presentation of the single set of search results is modified or tailored based on the particular display on which the media is to be viewed. For example, if the single set of search results is viewed on a very small screen, such as that of a smart phone or a PDA, the images associated with the particular search results may be eliminated, or the search results may be abbreviated or truncated due to screen space constraints. However, the very same set of search results, if viewed on a very large screen, may be modified to include additional or more detailed information, or larger or animated associated pictures.

In yet another embodiment, a previously obtained set of media search results can be retrieved from hard disk 310 and loaded into the searching module 514 for the purpose of updating the search results. In this embodiment, the searching module 514 does not again search media providers/sources already listed in the search results, but only searches media providers/sources that previously did not return results. In an alternative embodiment, the searching module 514 searches every available media provider/source including those already listed in the search results. However, the searching module 514 only creates a set or sets of search results that are different from the existing search results. The original single set of search results and the updated set or sets of search results are passed to the consolidating module 512 for consolidation into a single set of updated search results.

In yet another embodiment, all searching functions can be scheduled to run at a particular time of day. For example, a search can be scheduled to run late at night after the user has gone to sleep so that the search can be completed during a time when network traffic reduced. The search can then be presented to the user the next morning.

In still another embodiment, all the functionality of the media search device is implemented as a program of instructions stored on a computer-readable medium such as a floppy disk, compact disk, digital video disk, or other portable or removable drive (e.g., a USB thumb drive). The computer-readable medium is accessible by a computer or other processing device, which is configured to execute the program of instructions stored thereon to perform the search and display functions described in detail hereinabove.

LIST OF ACRONYMS USED IN THE DETAILED DESCRIPTION OF THE INVENTION

The following is a list of the acronyms used in the specification in alphabetical order.
AP access point
DVD digital video disc
DVR digital video recorder
GUI graphical user interface
HTPC home theater personal computer
LAN local area network
LCD liquid crystal display
NAS network attached storage
PC personal computer
PDA personal data assistant
VRAM volatile random access memory
WiFi wireless fidelity Alternate Embodiments Alternate embodiments may be devised without departing from the spirit or the scope of the invention.

What is claimed is:

1. A method for obtaining a single set of media search results from a search of each of a plurality of media sources and displaying the single set of media search results on a display device, the method comprising:
   providing a media search query;
   executing a search of each of the plurality of media sources for media based on the provided media search query;
   generating results of the search of each of the plurality of media sources;
   consolidating the results of each of the plurality of searches into the single set of media search results comprising a list of media items, each of the listed media items having associated metadata;
   organizing the media items into two or more groups, each of the two or more groups including media items having similar content, the similarity of the content of the media items being defined by the media items' associated metadata meeting or exceeding a metadata matching threshold;
   filtering the two or more groups of media items;
   sorting the two or more groups of media items with respect to each other according to cost or quality of service of the media;
   sorting the media items within each of the two or more groups of media items according to the resolution of the media items; and
   displaying the two or more groups of media items on the display device, each of the two or more groups of media items including a list of locations from which the media items can be obtained, the locations being listed in an order according to the sort order of the media items.

2. The method of claim 1, wherein the media items within each of the two or more groups are further sorted according to a quality of service with which the media items can be obtained, purchase price of the media items, or a user's previous sorting criteria.

3. The method of claim 1, wherein the filtering comprises eliminating media items from each of the two or more groups of media items according to at least one of media content, media location, media format, and media duration.

4. The method of claim 1, further comprising saving the media search query and the single set of media search results.

5. The method of claim 1, further comprising displaying on the display device a preview thumbnail picture associated with at least one of each of the media items listed in the single set of media search results, each group of media items, and each of the media items within the two or more groups of media items.

6. The method of claim 1, wherein the plurality of media sources comprises at least one of a hard disk disposed in a user's local desktop computer, mobile/portable computer, a home theater personal computer, a network attached storage device, a local external hard disk, a personal data assistant, a mobile phone, a digital video recorder, a DVD/Blu-Ray disc changer, an audio storage and playback device, a digital video camera, a digital picture camera, a remote computer server, and a remote database.

7. The method of claim 1, wherein each media item listed in the single set of media search results includes an associated link, the link providing access to the associated media item for at least one of downloading, viewing, and hearing, the media item comprising one of a digital image file, a digital video file, a digital audio file, or an archive file comprising at least one of a digital image file, a digital video file, and a digital audio file.

8. A system (100) for obtaining and displaying a single set of media search results from a search of each of a plurality of media sources, the system (100) comprising:
  a display device (104); and
  at least one processor comprising:
    an input module (502) configured for receiving a media search query;
    a search module (514) configured for executing a search of each of the plurality of media sources (108, 120, 144, 128, 112, 142, 138a, 140a) for media based on the received media search query;
    a consolidating module (512) configured for consolidating the results of each of the plurality of searches into the single set of media search results comprising a list of media items, each of the listed media items having associated metadata;
    a grouping module (516) configured for organizing the media items into two or more groups, each of the two or more groups including media items having similar content, the similarity of the content of the media items being defined by the media items' associated metadata meeting or exceeding a metadata matching threshold;
    a filtering module (520) configured for filtering the two or more groups of media items;
    a sorting module (518) configured for sorting the two or more groups of media items with respect to each other according to cost or quality of service and for sorting the media items within each of the two or more groups of media items according to the resolution of the media items; and
    a presenting module (510) configured for displaying the two or more groups of media items on the display device (104), where each of the two or more groups of media items includes a list of locations (906, 908) from which the media items can be obtained, and where the locations are listed in an order according to the sort order of the media items.

9. The system of claim 8, further comprising a mass storage device (310) configured for storing the media search query and the single set of media search results.

10. The system of claim 8, wherein the sorting module (518) is configured for further sorting media items within each of the two or more groups according to a quality of service with which the media items can be obtained, purchase price of the media items, or a user's previous sorting criteria.

11. The system of claim 8, wherein the filtering module (520) is configured for eliminating results from each of the two or more groups of media items according to at least one of media content, media location, media format, and media duration.

12. The system of claim 8, wherein the presenting module (510) is further configured for displaying on the display device (104) a preview picture associated with at least one of each of the media items listed in the single set of media search results, each group of media items, and each of the media items within the two or more groups of media items.

13. The system of claim 8, wherein the plurality of media sources comprises at least one of a hard disk disposed in a user's local desktop computer (120), mobile/portable computer (126a), a home theater personal computer (112), a network attached storage device (128), a local external hard disk (144), a personal data assistant (118a), a mobile phone (134a), a digital video recorder (108), a DVD/Blu-Ray disc changer (142), an audio storage and playback device (114), a digital video camera (122), a digital picture camera (124), a remote computer server (138a), and a remote database (140a).

14. The system of claim 8, wherein each media item listed in the single set of media search results includes an associated link, the link providing access to the associated media item for at least one of downloading, viewing, and hearing, the media comprising one of a digital image file, a digital video file, a digital audio file, or an archive file comprising at least one of a digital image file, a digital video file, and a digital audio file.

15. The system of claim 8, wherein the display device comprises one of a television (110), a computer monitor (104), a mobile computer monitor, a touch screen (106), a mobile phone (134a), and a personal data assistant (118a).

16. A method for obtaining a single set of media search results from a search of each of a plurality of media sources and displaying the single set of media search results on a display device, the method comprising:
  providing a media search query;
  executing a search of each of the plurality of media sources for media based on the provided media search query;
  generating results of the search of each of the plurality of media sources;
  consolidating the results of each of the plurality of searches into the single set of media search results comprising a list of media items, each of the listed media items having associated metadata;
  organizing the media items into two or more groups, each of the two or more groups including media items having similar content, the similarity of the content of the media items being defined by the media items' associated metadata meeting or exceeding a metadata matching threshold;
  filtering the two or more groups of media items;
  sorting the two or more groups of media items with respect to each other according to cost or quality of service of the media;
  sorting the media items within each of the two or more groups of media items according to the resolution of the media items; and
  displaying the two or more groups of media items on the display device, each of the two or more groups of media items including a list of locations from which the media items can be obtained, the locations being listed in an order according to the sort order of the media items;
  wherein the plurality of media sources comprises at least one of a hard disk disposed in a user's local desktop computer (120), mobile/portable computer (126a), a home theater personal computer (112), a network attached storage device (128), a local external hard disk (144), a personal data assistant (118a), a mobile phone (134a), a digital video recorder (108), a DVD/Blu-Ray disc changer (142), an audio storage and playback device (114), a digital video camera (122), a digital picture camera (124), a remote computer server (138a), and a remote database (140a).

17. A system (100) for obtaining and displaying a single set of media search results from a search of each of a plurality of media sources, the system (100) comprising:
  a display device (104); and
  at least one processor comprising:
    an input module (502) configured for receiving a media search query;
    a search module (514) configured for executing a search of each of the plurality of media sources (108, 120, 144, 128, 112, 142,138a, 140a) for media based on the received media search query;
a consolidating module (512) configured for consolidating the results of each of the plurality of searches into the single set of media search results comprising a list of media items, each of the listed media items having associated metadata;
a grouping module (516) configured for organizing the media items into two or more groups, each of the two or more groups including media items having similar content, the similarity of the content of the media items being defined by the media items' associated metadata meeting or exceeding a metadata matching threshold;
a filtering module (520) configured for filtering the two or more groups of media items;
a sorting module (518) configured for sorting the two or more groups of media items with respect to each other according to cost or quality of service and for sorting the media items within each of the two or more groups of media items according to the resolution of the media items; and
a presenting module (510) configured for displaying the two or more groups of media items on the display device (104), where each of the two or more groups of media items includes a list of locations (906, 908) from which the media items can be obtained, and where the locations are listed in an order according to the sort order of the media items;
wherein the plurality of media sources comprises at least one of a hard disk disposed in a user's local desktop computer (120), mobile/portable computer (126a), a home theater personal computer (112), a network attached storage device (128), a local external hard disk (144), a personal data assistant (118a), a mobile phone (134a), a digital video recorder (108), a DVD/Blu-Ray disc changer (142), an audio storage and playback device (114), a digital video camera (122), a digital picture camera (124), a remote computer server (138a), and a remote database (140a).

18. A method for obtaining a single set of media search results from a search of each of a plurality of media sources and displaying the single set of media search results on a display device, the method comprising:
providing a media search query;
executing a search of each of the plurality of media sources for media based on the provided media search query;
generating results of the search of each of the plurality of media sources;
consolidating the results of each of the plurality of searches into the single set of media search results comprising a list of media items, each of the listed media items having associated metadata;
organizing the media items into two or more groups, each of the two or more groups including media items having similar content, the similarity of the content of the media items being defined by the media items' associated metadata meeting or exceeding a metadata matching threshold;
sorting the two or more groups of media items with respect to each other;
sorting the media items within each of the two or more groups of media items; and
displaying the two or more groups of media items on the display device, each of the two or more groups of media items including a list of locations from which the media items can be obtained, the locations being listed in an order according to the sort order of the media items.

19. A system (100) for obtaining and displaying a single set of media search results from a search of each of a plurality of media sources, the system (100) comprising:
a display device; and
at least one processor comprising:
an input module (502) configured for receiving a media search query;
a search module (514) configured for executing a search of each of the plurality of media sources (108, 120, 144, 128, 112, 142,138a, 140a) for media based on the received media search query;
a consolidating module (512) configured for consolidating the results of each of the plurality of searches into the single set of media search results comprising a list of media items, each of the listed media items having associated metadata;
a grouping module (516) configured for organizing the media items into two or more groups, each of the two or more groups including media items having similar content, the similarity of the content of the media items being defined by the media items' associated metadata meeting or exceeding a metadata matching threshold;
a sorting module (518) configured for sorting the two or more groups of media items with respect to each other and sorting the media items within each of the two or more groups of media items; and
a presenting module (510) configured for displaying the two or more groups of media items on the display device (104), where each of the two or more groups of media items includes a list of locations (906, 908) from which the media items can be obtained, and where the locations are listed in an order according to the sort order of the media items.

* * * * *